United States Patent
Margheritis et al.

(10) Patent No.: US 7,909,927 B2
(45) Date of Patent: Mar. 22, 2011

(54) RHEOLOGY MODIFYING ADMIXTURE

(75) Inventors: Giampietro Margheritis, Caravate (IT); Eva Baldaro, Milan (IT); Luca Perrone, Milan (IT); Giuseppe Li Bassi, Gavirate (IT)

(73) Assignee: Lamberti Spa, Albizzate (IT)

( * ) Notice: Subject to any disclaimer, the term of this patent is extended or adjusted under 35 U.S.C. 154(b) by 0 days.

(21) Appl. No.: 12/812,923

(22) PCT Filed: Jan. 15, 2009

(86) PCT No.: PCT/EP2009/050402
§ 371 (c)(1),
(2), (4) Date: Jul. 14, 2010

(87) PCT Pub. No.: WO2009/090203
PCT Pub. Date: Jul. 23, 2009

(65) Prior Publication Data
US 2010/0307381 A1 Dec. 9, 2010

(30) Foreign Application Priority Data

Jan. 16, 2008 (IT) .............. VA2008A0004

(51) Int. Cl.
*C04B 40/00* (2006.01)
*C04B 24/38* (2006.01)
*C04B 28/02* (2006.01)
*C08L 5/00* (2006.01)
*C09D 105/00* (2006.01)

(52) U.S. Cl. ............ 106/205.1; 106/730; 106/804; 106/823

(58) Field of Classification Search ............ 106/205.1, 106/730, 804, 823
See application file for complete search history.

(56) References Cited

U.S. PATENT DOCUMENTS

| | | | |
|---|---|---|---|
| 5,153,317 A * | 10/1992 | Ortega et al. | 8/543 |
| 6,966,379 B2 * | 11/2005 | Chatterji et al. | 166/308.6 |
| 7,238,733 B2 * | 7/2007 | Vijn et al. | 523/130 |
| 7,355,039 B2 * | 4/2008 | Rinaldi et al. | 536/123 |
| 7,396,924 B2 * | 7/2008 | Rinaldi et al. | 536/123 |
| 7,622,427 B2 * | 11/2009 | Sau et al. | 507/204 |
| 7,694,739 B2 * | 4/2010 | Brothers et al. | 166/294 |
| 7,798,224 B2 * | 9/2010 | Huang et al. | 166/280.1 |
| 2003/0078180 A1 * | 4/2003 | Munoz et al. | 510/407 |
| 2005/0037941 A1 * | 2/2005 | Munoz et al. | 510/424 |
| 2007/0284104 A1 * | 12/2007 | Beckman | 166/293 |

FOREIGN PATENT DOCUMENTS

| | | | |
|---|---|---|---|
| JP | 9-208287 A | * | 8/1997 |
| JP | 9-268046 A | * | 10/1997 |
| JP | 2002-356357 A | * | 12/2002 |

* cited by examiner

*Primary Examiner* — Anthony J Green
(74) *Attorney, Agent, or Firm* — Mossman, Kumar & Tyler, PC

(57) ABSTRACT

Rheology modifying admixture comprising a) from 80 to 99% w/w of hydroxyalkyl guar, cellulose ether, or mixture thereof; b) from 1 to 20% w/w of biopolymer selected from diutan gum and welan gum, and hydraulic compositions containing the rheology modifier admixture together with a superplasticizer.

20 Claims, 2 Drawing Sheets

Rheologic measurements

- ■ - FA1 - HPG/DG 95/5   0.03%
- ▼ - FA2 - HEC/DG 95/5   0.03%
- □ - FA3 - HPG           0.03%
- ▽ - FA4 - HEC           0.03%
- + - FA9 - DG            0.03%
- * - FA5 - DG            0.0015%

RHEOLOGY MODIFYING ADMIXTURE

TECHNICAL FIELD

The present invention refers to rheology modifiers useful in the preparation of flowable hydraulic compositions.

Specifically, the modifiers of the invention essentially contain a hydroxyalkyl guar or a cellulose ether and a small amount of diutan gum or welan gum.

In the present text the expression "flowable hydraulic composition" is used to indicate a cement based composition that can be cast without compaction and vibration.

Typical examples of flowable hydraulic compositions are self-levelling floorings that can be poured on uneven grounds to provide by themselves an even surface, where, for example, tiles or parquet can be laid.

BACKGROUND ART

Self levelling floorings contain special dispersants or superplasticizers that are essential to impart perfect fluidity and self-healing properties without excessively increasing the need of water.

Traditional dispersants, like casein and succinoglycan, provide self-levelling characteristics and also prevents the sag of fine aggregates.

Because of their draw-backs (evil smell, volatility in pricing for casein and high cost for succinoglycan) they are now largely replaced by synthetic polymeric dispersants providing excellent flowability (superplasticizers).

Another typical example of flowable hydraulic compositions is flowable concrete, or self-compacting, or self-consolidating concrete (SCC).

Flowable concrete is a non segregating concrete that can be spread into place, fill formwork and encapsulate reinforcements without any mechanical vibration.

The development of flowable concrete closely followed the advent and improve of superplasticizers technology, although the term SCC was coined only in the end of the 1990's, as discussed in "Self-Compacting Concrete: what is new?", by M. Collepardi (in Proc. $7^{th}$ CANMET/ACI Int. Conf. on Superplasticizers and Other Chemical Admixtures in Concrete, Berlin, Germany, 20-24 October, p 1-16, 2003).

Superplasticizers provide flowability but do not impart resistance to segregation and bleeding.

Rheology modifying admixtures (RMA) have been therefore developed to enhance the cohesion and stability of cement based systems.

RMA are usually natural polymers or derivatives thereof that enhance the water retention capability, the yield value and plastic viscosity of hydraulic compositions and control bleeding and segregation, without adversely affecting the levelling properties.

Welan gum, diutan gum and cellulose ether derivatives, such as methyl cellulose and hydroxypropylmethyl cellulose are by far the most used RMA for flowable hydraulic compositions.

Welan gum (CAS No. 96949-22-3) is an anionic polysaccharide with excellent thermal stability and retention of viscosity at elevated temperatures.

The welan molecule consists of tetrasaccharide repeating units, each carrying a single sugar branch of either L-mannose or L-rhamnose.

Diutan gum (CAS No. 125005-87-0) is a natural high molecular weight gum produced by carefully controlled aerobic fermentation. The repeating unit is comprised of a six sugar unit. The backbone is made of D-glucose, D-glucuronic acid, D-glucose and L-rhamnose and the side chain of two L-rhamnose.

Diutan gum possesses the highest dose efficiency among the known RMA.

Welan gum and diutan gum are more pseudoplastic than cellulose ethers and effectively prevent particles sag and bleeding at lower concentrations.

For SCC, a dosage of 0.04% by mass of water of diutan is reported to be a very low dosage in "Performance of Self-Consolidating Concrete made with Diutan Gum", by Khayat, K. H. et al., in American Concrete Institute SP-239, Proc. $8^{th}$ CANMET/ACI Int. Conf. on Superplasticizers and Other Chemical Admixtures in Concrete, 2006, p. 545-566.

In self-leveling flooring, where coarse aggregates are absent, a lower minimum dosage of diutan gum is recommended in the common practice.

Notwithstanding their low minimum dosages, the major draw-back of welan and diutan gum is their high cost; they are produced in fermentation processes yielding a broth of low biopolymer concentration and are among the most expensive admixtures currently in use (a relative price indication for various additives of natural origin for building material can be found in "Application of biopolymers and others biotechnology products in building materials", by Plank J., in Appl. Microbiol. Biotechnol. (2004), 66, 1-9).

DISCLOSURE OF THE INVENTION

Surprisingly, it has now been found that the minimum dosage of diutan and welan gum can be reduced about ten folds if concurrently hydroxyalkyl guar or cellulose ether is added to the flowable hydraulic composition as the major component of the RMA.

Minimum dosage is meant as the minimum amount of RMA that allows good flowability and effective anti-bleeding.

It is therefore a fundamental object of the present invention a rheology modifying admixture comprising a) from 80 to 99% w/w of hydroxyalkyl guar, cellulose ether, or mixture thereof; b) from 1 to 20% w/w of biopolymer selected from diutan gum and welan gum.

Another object of the invention is a dry hydraulic composition comprising i) from 40 to 80% by weight of sand, ii) from 0 to 60% of gravel, iii) from 10 to 40% of cement, iv) from 0.1 to 10% by weight of a superplasticizer, characterized by the fact that it contains from 0.02 to 0.1% by weight of the above described rheology modifying admixture.

Still another object of the invention is a hydraulic flowable composition prepared by mixing the afore said dry hydraulic compositions and from 10 to 40 parts by weight water per 100 parts by weight of dry composition.

Advantageoulsy, the rheology modifying admixture of the invention comprises a) from 89 to 98% by weight of hydroxyalkyl guar; b) from 2 to 11% by weight of a biopolymer selected from diutan gum and welan gum.

More preferably the biopolymer used is diutan gum.

Useful hydroxyalkyl guars are hydroxypropyl guar, hydroxyethyl guar, hydroxyethylhydroxypropyl guar and mixture thereof, hydroxypropyl guar being preferred for the realization of the invention.

Guar, or guar gum, is a polysaccharide belonging to the family of galactomannans and is extracted from a leguminosae, "Cyamopsis Tetragonolobus", that grows in the semi-dry region of tropical countries, particularly in India and in Pakistan.

Its hydroxypropyl and hydroxyethyl derivatives (respectively HPG and HEG) are commonly employed in the textile industry as printing paste thickeners, in the paints and coatings and building industry as rheology modifiers, in the drilling industry, in paper and explosives production and in other industry sectors (Industrial Gums 3$^{rd}$ Ed., 1993, Academic Press Inc., pp 199-205).

They are prepared from guar gum by reaction with ethylene oxide and/or propylene oxide under basic conditions, according to procedures well known to the man skilled in the art.

Alternatively, they can be found on the market under the trade name Esacol®, from Lamberti SpA.

Suitable hydroxyalkyl guar are both purified and unpurified crude products. When unpurified hydroxypropyl guar is used, it can comprise up to 20% of hydroxyalkylation side products, mainly consisting of inorganic salts and glycols and lower polyglycols, and up to 10% of water.

Hydroxypropyl guar having molar substitution between 0.3 and 3, more preferably between 0.7 and 2, and Brookfield® viscosity from 300 to 15,000 mPa·s in aqueous solution at 2% by weight are particularly preferred for the realization of the present invention.

In the present text, the molar substitution, that is the average number of moles of alkylating agent bonded per monosaccharidic unit, is also indicated with MS.

Example of cellulose ether useful for the realization of the present invention are hydroxyethyl cellulose, methyl cellulose, hydroxypropylmethyl cellulose, ethylhydroxyethyl cellulose, ethyl cellulose and mixture thereof.

Diutan gum and welan gum are commercially available biopolymers; they are sold by CP Kelco under the trade name Kelco-Crete®.

The typical 2% by weight Brookfield® viscosity of the RMA of the invention is from 200 to 15,000 mPa·s.

The rheology modifying admixture can be readily prepared by dry mixing the hydroxyalkyl guar and/or the cellulose ether and the biopolymer.

The dry hydraulic mixture of the invention is subsequently prepared by adding the RMA to the other ingredients, in any order.

Alternatively, the hydroxyalkyl guar, the cellulose ether and the biopolymer can be separately mixed with the proper amounts of binder (cement), aggregate material (gravel and/or sand) and superplasticizer, in any order, to obtain the above described dry hydraulic compositions, but due to the small amount of biopolymer, it is preferred to separately prepare the RMA.

When the hydraulic composition of the invention is used to prepare self-leveling flooring, only fine aggregates with maximum size of about 1.50 mm are used (sand); preferably siliceous sand with max size 1.30 mm is used. When the dry hydraulic composition is used for self leveling floorings (self levelling composition), it preferably comprises i) from 60 to 80% by weight of sand, ii) 0% of gravel, iii) from 20 to 40% of cement, iv) from 0.1 to 10% by weight, more preferably from 1 to 5% by weight, of a superplasticizer and from 0.02 to 0.05% by weight of the rheology modifying admixture of the invention.

Self levelling compositions may further contain hydrated calcium sulphate, natural or synthetic anhydrites, biocides, antifoam agents, redispersible resins and other additives well known in the art.

When the hydraulic composition of the invention is used to prepare flowable concrete, coarser aggregates (gravel) are present.

The dry hydraulic composition useful for preparing self compacting concrete (SCC composition) preferably comprises i) from 40 to 60% by weight of sand, ii) from 20 to 60% of gravel, iii) from 10 to 40% of cement, iv) from 0.1 to 10% by weight, more preferably from 1 to 5% by weight, of a superplasticizer and from 0.02 to 0.1% by weight of the rheology modifying admixture according to the invention.

SCC composition may further contain mineral additions and other conventional additives.

Typical optional mineral additions are fly ash, ground limestone, silica fume.

In self compacting concrete the volume of powder material (max. size 0.075 mm) including cement, optional mineral additions and the finest particles of sand should be in the range of 170-200 l/m$^3$.

The superplasticizer may be a sulfonated melamine-formaldehyde resin, a sulfonated naphthalene-formaldehyde resin, a polycarboxylate ether; preferably the superplasticizer is a sulfonated melamine-formaldehyde resin.

The hydraulic flowable compositions of the present invention is normally prepared from the dry hydraulic composition of sand, cement, optional gravel (optional), superplasticizer and rheology modifying admixture based on hydroxyalkyl guar and biopolymer, by adding gradually said dry composition to water and mixing.

The correct amount of water is the one that makes it possible to obtain a flowable hydraulic composition.

Normally this amount ranges from 10 to 40, preferably from 15 to 30, parts by weight of water per 100 parts by weight of dry composition.

The rheology modifying admixture of the invention does not negatively affect the other essential parameters of hydraulic flowable compositions, such open time, air entrainment and compressive strength development.

EXAMPLE 1

Figure 1:
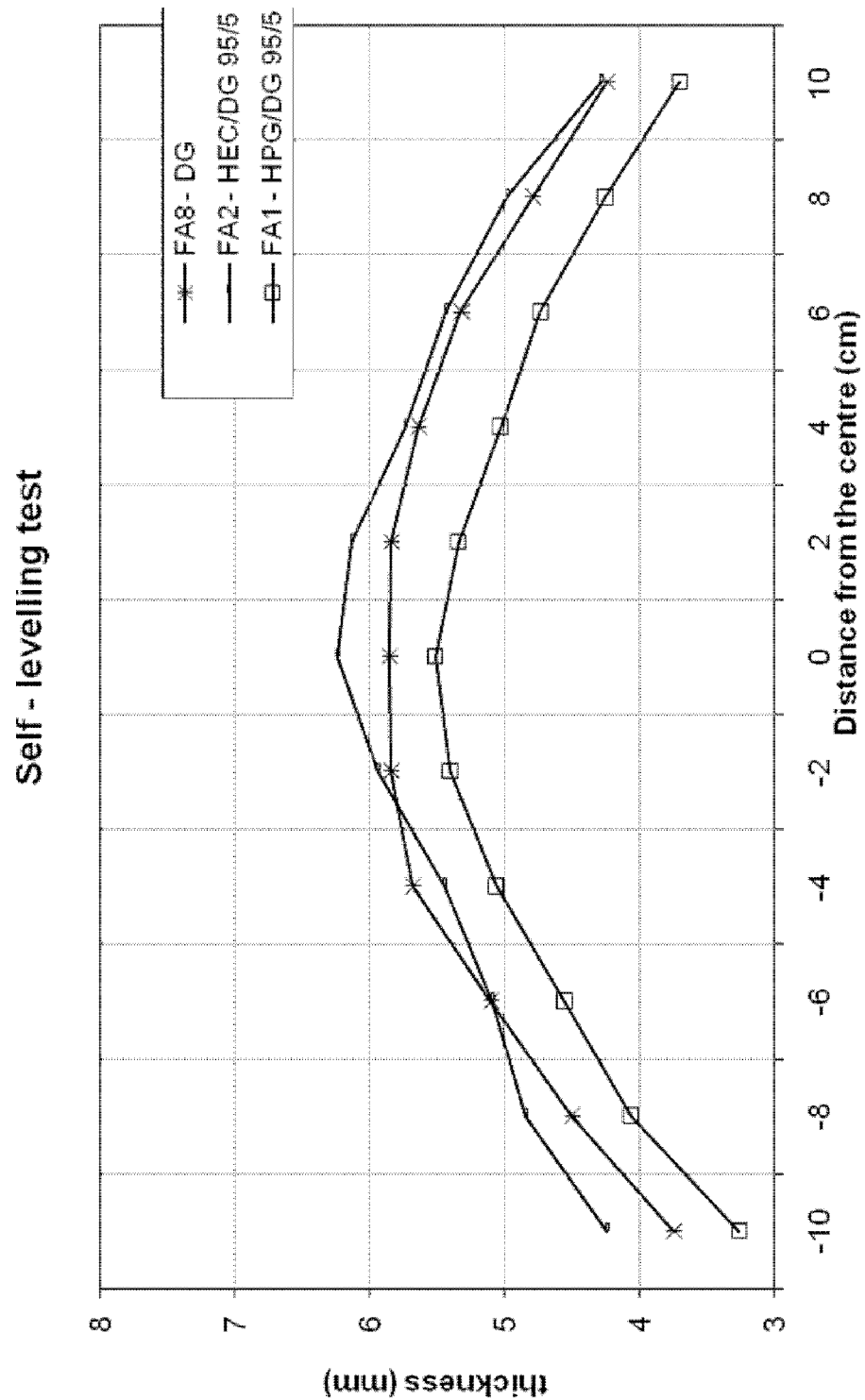
FIG. 1 illustrates the levelling efficiency of two flowable hydraulic compositions according to the invention (FA1 and FA2) and of a composition containing 0.02% diutan gum, the dosage imparting effective anti-bleeding.

A rheology modifying admixture is prepared by dry blending 5 parts by weight of Kelco-Crete® 200 (diutan gum from CP Kelco) and 95 parts by weight of Esacol® HS30 (hydroxypropyl guar from Lamberti SpA, MS 1.8 and Brookfield® viscosity 10,000 at 2%, 20 rpm and 20° C.).

EXAMPLE 2

A rheology modifying admixture is prepared by dry blending 5 parts by weight of Kelco-Crete® 200 and 95 parts by weight of Tylose ® H300, hydroxyethyl cellulose from Clariant having Brookfield® viscosity 700 mPa·s at 2%, 20 rpm and 20° C.

EXAMPLE 3 (COMPARATIVE)

The rheology modifying admixture of Example 3 consists of Esacol® H530.

EXAMPLE 4 (COMPARATIVE)

The rheology modifying admixture of Example 4 consists of Tylose® H300.

Application Tests.

A composition (Composition A) is prepared by combining:

| | |
|---|---|
| Silica sand (0-1.25 mm) | 73.4 (parts by weight) |
| Portland Cement I 42.5 R | 24.6 (parts by weight) |
| Superplasticizer[1] | 1.5 (parts by weight) |

[1]Peramin SMF10, sulfonated melanine formaldehyde polymer from Peramin AB (Sweden).

Composition A is divided in portions: one of them is used in the application tests as such (blank); 0.03% of a rheology modifying admixture of the Examples 1-4 are added to portions of Composition A and the resulting hydraulic compositions (Composition A1-A4) are thoroughly mixed.

Five more hydraulic compositions are prepared by adding to portions of Composition A, respectively, 0.0015%, 0.005%, 0.01%, 0.02% and 0.03% of diutan gum. (Compositions A5-A9)

Composition A and Compositions A1-A9 are added while stirring to water (20 parts of water each 100 parts of dry composition) to obtain ten flowable hydraulic compositions (respectively FA and FA1-FA9).

Table 1 and Table 2 report the content of hydroxypropyl guar (HPG), hydroxyethylethyl cellulose (HEC) and diutan gum (DG) in the flowable hydraulic compositions (% on dry matter).

TABLE 1

| | Flowable composition | | | | |
|---|---|---|---|---|---|
| | FA** | FA1 | FA2 | FA3* | FA4* |
| HPG | — | 0.0285 | — | 0.03 | — |
| HEC | — | — | 0.0285 | — | 0.03 |
| DG | — | 0.0015 | 0.0015 | — | — |

*comparative
**blank

TABLE 2

| | Flowable composition | | | | |
|---|---|---|---|---|---|
| | FA5* | FA6* | FA7* | FA8* | FA9* |
| HPG | — | — | — | — | — |
| HEC | — | — | — | — | — |
| DG | 0.0015 | 0.005 | 0.01 | 0.02 | 0.03 |

*comparative

Self-Levelling and Anti-Bleeding Effect.

Method:

The flowable hydraulic compositions are poured in a brass cone (ASTM standard C230, base internal diameter 66 mm, top internal diameter 38 mm and height 90 mm), which is mounted on a 30 cm×30 cm glass plate covered with a polyethylene film.

After one minute the cone is removed and the resulting disc is allowed to harden.

The self levelling effect is evaluated by measuring, after 24 hours from removal of the cone, the thickness of the discs at the centre and at 2, 4, 6, 8 and 10 cm away from centre.

The smaller the difference between the thickness measured at the centre and at 10 cm away from the centre (Δ in Table 3 and 4), the better the self-levelling effect.

The anti-bleeding effect is visually evaluated after the cone removal, on the dried discs.

The following scale is used:
High bleeding=+
Sensible bleeding=++
Low Bleeding=+++
Very low bleeding=++++

The presence of dark irregular deposits in the external zone of the disc is index of high bleeding (+).

The degree of bleeding is further evaluated by comparing the presence and width of a clear annular peripheral zone on the surface of the discs, which is due to the separation, in the wet fluid mixture, in water-reach and in water-poor zones.

Sensible bleeding means that the annular peripheral zone measures ⅓ of the disc ray or more.

Low bleeding means that the annular peripheral zone measures from ⅟₁₀ to ⅓ of the disc ray.

Very low bleeding means that the annular peripheral zone measures ⅟₁₀ of the disc ray or less.

Results:

The anti-bleeding and self-levelling results are summarized in Table 3 and 4.

TABLE 3

| | Disc from flowable composition: | | | | |
|---|---|---|---|---|---|
| | FA** | FA1 | FA2 | FA3* | FA4* |
| Anti-bleeding effect | + | ++++ | +++ | +++ | +++ |
| Δ (mm) | 3.1 | 2.2 | 2.0 | 2.1 | 2.5 |

*comparative
**blank

TABLE 4

| | Disc from flowable composition: | | | | |
|---|---|---|---|---|---|
| | FA5* | FA6* | FA7* | FA8* | FA9* |
| RMA %*** | DG 0.0015% | DG 0.005% | DG 0.01% | DG 0.02% | DG 0.03% |
| Anti-bleeding effect | + | ++ | ++ | ++++ | +++ |
| Δ (mm) | 2.7 | 1.1 | 1.2 | 2.1 | 3.1 |

*comparative
***rheology modifying admixture description and % on dry matter

It can be seen that the best anti-bleeding effect is obtained with the composition containing 0.03% of the rheology modifying admixture of Example 1, that is with the composition containing 0.0015% only of diutan gum and HPG.

To achieve the same result with diutan gum alone, 0.02% of diutan gum are needed, that is more than ten folds the amount of diutan which is present in the rheology modifying admixture of Example 1.

From the self leveling data of the comparative compositions containing different amounts of diutan gum alone, it can be seen that the lowest dosage (0.0015%) does not confer to the composition satisfactory self-leveling properties.

The intermediate dosages (0.005%, 0.01%, 0.02%) give from very good to good results in term of self-levelling (but it should be noticed that only the 0.02% dosage gives effective anti-bleeding).

The self levelling data of the compositions according to the invention (FA1 and FA2) and of the comparative composition containing 0.02% diutan gum alone (the dosage giving the best anti-bleeding effect) are reported in FIG. 1.

Anti-Sagging Effect.

The anti-sagging effect of the rheology modifying admixtures of Example 1-4 are evaluated by rheology measurements.

The rheology measurements are performed with a Physica S200 instrument and relative software. A "ball measuring system" KMS-1 with 15 mm ball at CSR gap 0 mm (19 mm from the bottom) is used. The analysis is performed 20 minutes after the preparation of the flowable compositions FA1-FA6, continuously kept under stirring.

The ball is completely immersed in the composition. The more efficient the RMA in suspending particles, the lower the viscosity of the compositions.

Figure 2:
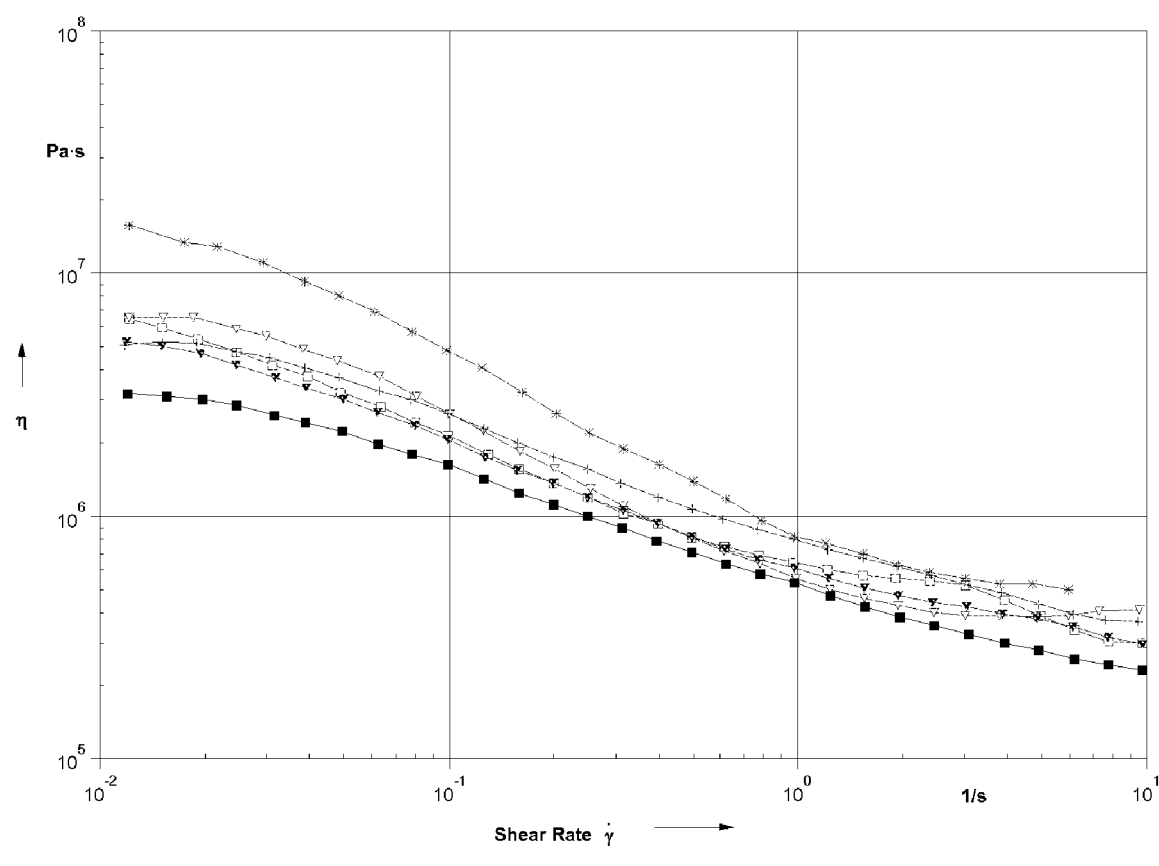
FIG. 2 illustrates the rheology measurements taken on FA1, FA2 and on comparative compositions.

The data are reported in FIG. 2 and in Table 5.

TABLE 5

| Flowable hydraulic | Viscosity (KPa * s) | | |
|---|---|---|---|
| composition | $0.012\ s^{-1}$ | $0.017\ s^{-1}$ | $0.020\ s^{-1}$ |
| FA1 | 3,180 | 3,080 | 3,020 |
| FA2 | 5,200 | 5,000 | 4,650 |
| FA3** | 6,500 | 5,900 | 5,300 |
| FA4** | 6,590 | 6,530 | 6,100 |
| FA5** | 15,700 | 13,300 | 12,800 |
| FA9** | 5,100 | 5,240 | 5,110 |

**comparative

It can be seen that the best performance are again obtained with the composition FA1 (HPG/diutan gum 95/5).

Especially at low shear rates, the improvement obtained by adding a small amount of diutan to hydroxypropyl guar or hydroxyethyl cellulose is particularly relevant.

It should be noticed that by 20 folds increasing the amount of diutan alone (comparison between FA5 and FA9) the viscosity is only 3 folds diminished at low shear rate, while the presence of 5% diutan in the rheology modifying admixture based on hydroxylalkyl guar (comparison between FA1 and FA3) halves the viscosity, i.e. highly inhibits sagging.

The invention claimed is:

1. A rheology modifying admixture comprising:
   from about 80 to about 99% w/w of a hydroxyalkyl guar; and
   from about 1 to about 20% w/w of a biopolymer selected from the group consisting of diutan gum, welan gum, and mixtures thereof.

2. The rheology modifying admixture of claim 1 wherein the hydroxyalkyl guar is present at a concentration of from about 89 to about 98% w/w of the rheology modifying admixture.

3. The rheology modifying admixture of claim 2 wherein the biopolymer is present at a concentration of from about 2 to about 11% w/w of the rheology modifying admixture.

4. The rheology modifying admixture of claim 1 wherein the biopolymer is diutan gum.

5. The rheology modifying admixture of claim 1 wherein the biopolymer is welan gum.

6. The rheology modifying admixture of claim 1 wherein the biopolymer is a mixture of diutan gum and welan gum.

7. The rheology modifying admixture of claim 1 wherein the hydroxyalkyl guar is selected from the group consisting of hydroxypropyl guar, hydroxyethyl guar, hydroxyethyl hydroxypropyl guar and mixtures thereof.

8. The rheology modifying admixture of claim 7 wherein the hydroxyalkyl guar has a molar substitution of from about 0.3 to about 3.0.

9. The rheology modifying admixture of claim 8 wherein the hydroxyalkyl guar is hydroxypropyl guar.

10. The rheology modifying admixture of claim 8 wherein the hydroxyalkyl guar is hydroxyethyl guar.

11. The rheology modifying admixture of claim 8 wherein the hydroxyalkyl guar is hydroxyethyl hydroxypropyl guar.

12. The rheology modifying admixture of claim 9 wherein the hydroxypropyl guar has a Brookfield® viscosity from about 300 to about 15,000 mPa·s in an aqueous solution at 2% by weight.

13. The rheology modifying admixture of claim 9 wherein the hydroxypropyl guar has a molar substitution of from about 0.7 to about 2.0.

14. A dry hydraulic composition comprising:
   from 40 to 80% by weight of sand,
   from 10 to 40% of cement, and
   from 0.1 to 10% by weight of a super plasticizer;
   wherein the super plasticizer includes from about 0.02 to about 0.1% by weight of a rheology modifying admixture of claim 1.

15. The dry hydraulic composition of claim 14 wherein:
   the sand is present at from about 60 to about 80% by weight;
   the cement is present at from about 20 to about 40% by weight;
   the superplasticizer is present at a concentration of from about 0.1 to about 5%; and
   the superplasticizer includes from about 0.02 to about 0.05% by weight of the rheology modifying admixture of claim 1.

16. The dry hydraulic composition of claim 14 wherein:
   the sand is present at from about 40 to about 60% by weight; and
   the cement is present at from about 10 to about 40% by weight.

17. The dry hydraulic composition of claim 14 additionally comprising gravel.

18. The dry hydraulic composition of claim 17 wherein the gravel is present at a concentration of at least about 20% by weight of the dry hydraulic composition.

19. A flowable hydraulic composition prepared using a method comprising mixing 100 parts by weight of a dry hydraulic compositions with from 10 to 40 parts by weight water wherein the dry hydraulic composition comprises:
   from 40 to 80% by weight of sand,
   from 10 to 40% of cement, and
   from 0.1 to 10% by weight of a superplasticizer;
   wherein the super plasticizer includes from about 0.02 to about 0.1% by weight of a rheology modifying admixture of claim 1.

20. The flowable hydraulic composition of claim 19 wherein the flowable hydraulic composition is prepared using the method additionally comprising mixing gravel with the sand, cement and superplasticizer.

* * * * *